Dec. 29, 1936. O. C. RITZ-WOLLER 2,066,055
MAKE-UP MIRROR
Filed Nov. 9, 1934 2 Sheets-Sheet 2
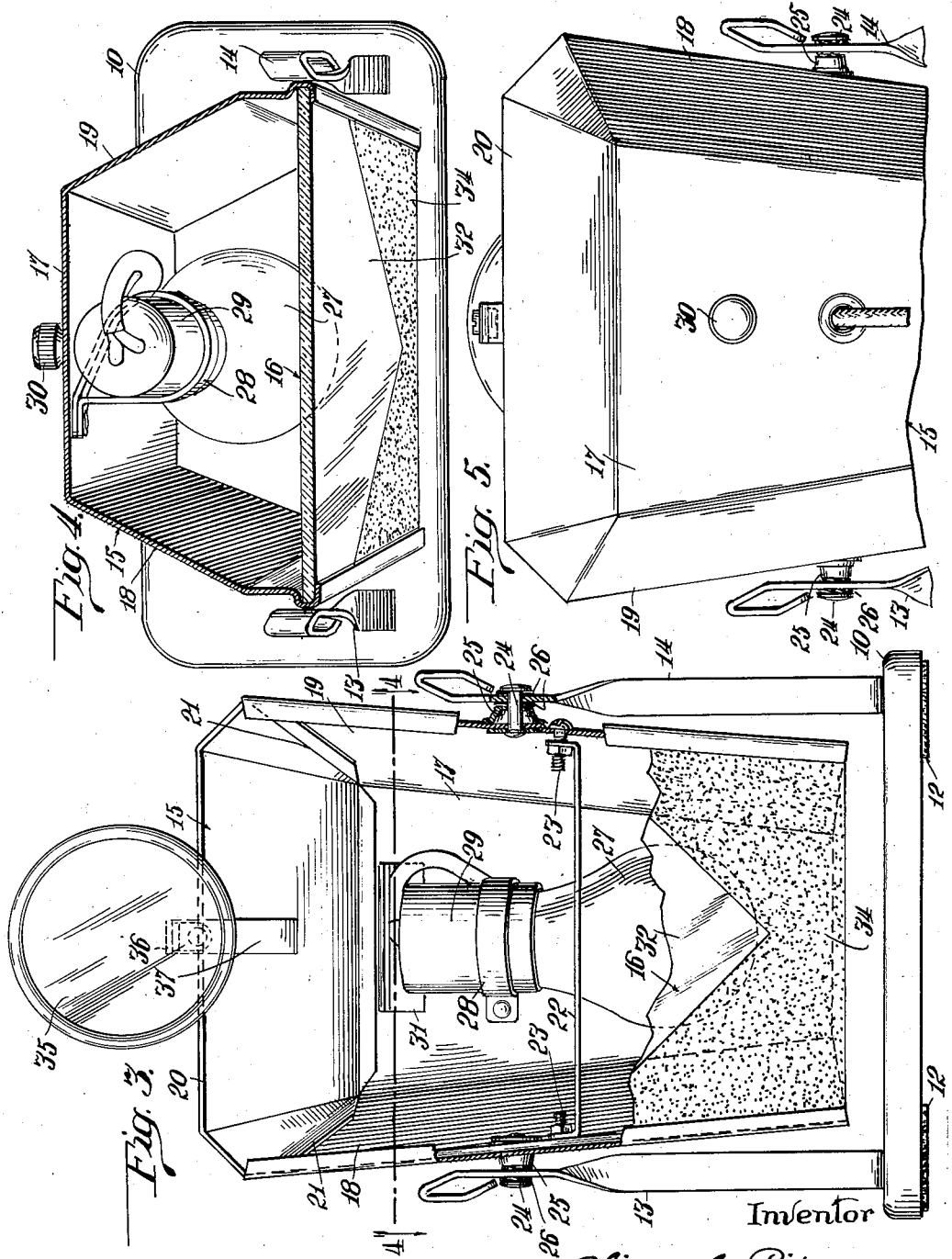
Inventor
Oliver C. Ritz-Woller
By Fricke & DeBuck
Attorneys Patented Dec. 29, 1936

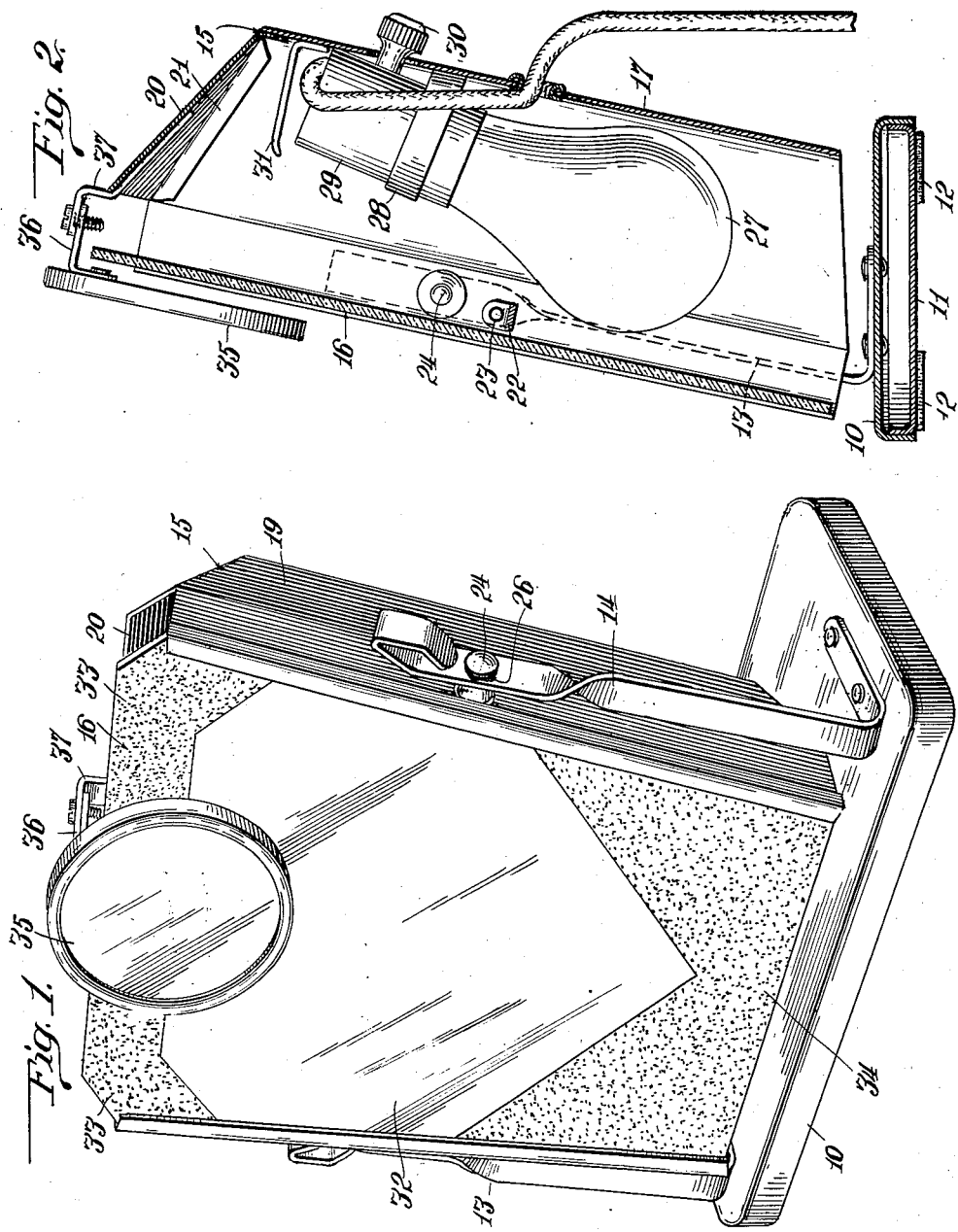

2,066,055

UNITED STATES PATENT OFFICE 2,066,055

MAKE-UP MIRROR

Oliver C. Ritz-Woller, Chicago, Ill.

Application November 9, 1934, Serial No. 752,196

3 Claims. (Cl. 240—4.2)

My invention relates to make-up mirrors of the type in which both plain and magnifying mirror surfaces are provided and in which an electric light globe or other suitable source of light is included, and it has for its object the provision of a new and improved form and arrangement of parts by which improved lighting effects shall be produced for facilitating the use of both of said mirror surfaces from approximately the same inspection point and by reason of which the parts may be manipulated to advantage for accommodating the varied conditions of use.

It is one of the objects of my invention to provide an improved arrangement of this type in which the electric light globe is enclosed within a housing which largely shuts off the escape of light except at certain predetermined desired points and by which the light escaping at such predetermined points is softened and subdued so as to avoid undesirable glare while at the same time the required lighting effect is attained. It is another object of my invention to provide an improved arrangement of this type in which adequate ventilation openings are provided for the escape of the heat from the lamp, and to provide a construction which can be produced cheaply and advantageously on a commercial scale.

It is another object of my invention to provide an improved arrangement of mounting means for the magnifying mirror, whereby the mirror may be moved to and held in various adjusted positions to meet the varying needs of users.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 1 is a perspective view of my improved mirror assembly;

Fig. 2 is a central vertical sectional view through the device as shown in Fig. 1;

Fig. 3 is a front face view of the device of Fig. 1 but with parts broken away and other parts shown in section for clearness of illustration;

Fig. 4 is a horizontal cross sectional view taken at line 4—4 of Fig. 3; and

Fig. 5 is a rear face view of the upper end portion of my improved device.

Referring now to the several figures of the drawings, in which corresponding parts are indicated by the same reference characters, 10 and 11 indicate dished housing members which are telescopically connected to each other for forming a base, and having a plurality of pads 12 of felt or other suitable material secured on its bottom face. At opposite ends of my improved base I have provided arms 13 and 14 of strip metal secured at their lower ends to the base and rising therefrom in spaced relation. Between the arms 13 and 14, I have pivotally mounted a housing comprising a housing member 15 of sheet metal and a front panel of glass suitably secured to said member 15.

As is best shown in Fig. 4, my improved housing member 15 comprises a back wall portion 17 and side wall portions 18 and 19 which in the arrangement shown are formed integrally with each other (see Fig. 4), whereby said wall portions have a resilient connection, said side wall portions 18 and 19 being in forwardly divergent position with respect to each other. A top wall portion 20 is secured by means of flange portions 21 at its edges to the back wall portion 17 and the side wall portions 18 and 19, such top wall portion 20 extending forwardly and upwardly and terminating some little distance in rear of the front edges of the side wall portions 18 and 19. As is clearly shown in Fig. 4, the forward edge portions of the side walls 18 and 19 are bent to provide inwardly opening grooves for the reception of the front panel 16 of glass. As is clearly shown in Figs. 1 and 5, the side wall portions 18 and 19 converge downwardly, wherefore the inwardly open grooves also converge downwardly. For tightening the side walls 18 and 19 upon the edges of the glass 16, I have provided a tie bar 22 in the form of a strip of metal connected rigidly at one end with the wall 18 and adjustably connected at its opposite end with the wall 19 by means of a screw-threaded bolt 23. By this arrangement, the side walls can be forced against the resiliency of the sheet metal at the corners of the housing into gripping engagement with the glass 16 for holding it snugly in position.

As is best shown in Fig. 3, the housing is mounted upon the arms 13 and 14 by means of trunnions 24 extending outwardly from said wall portions, such trunnions being mounted in suitable openings in the arms 13 and 14. For holding the housing yieldingly in adjusted position with respect to the arms 13 and 14, I have provided collars 25 about the trunnions 24, spring washers 26 being mounted upon the trunnions 24 at both faces of the arms 13 and 14 for providing the desired frictional effect between the housing and the arms.

Means is provided within the housing for supporting an electric light globe 27 in position, comprising a band 28 extending about the socket 29 in which the globe is mounted for securing the socket rigidly in position on the front face of the back wall 17. In the arrangement shown, the operating button 30 of the socket 29 extends through a suitable opening in the back wall 17. For holding the socket 29 down in proper position, I have provided an arm 31 of sheet metal extending forwardly from the back wall 17 immediately above the position of the socket.

As is best shown in Fig. 1, the glass panel 16 is given a varied appearance on its front face. For this purpose, the intermediate portion of the glass vertically is left clear and is covered by a coating of mercury or other silvering material for causing said intermediate portion 32 to have a mirror effect. At the top and the bottom portions, the glass 16 is ground or otherwise treated for making it translucent,—namely, at the top portion 33 and the bottom portion 34. By the provision of the mirror surface 32 opposite the electric light globe 27, so that the globe is located closely adjacent to the edge of the mirror, a considerable proportion of the light from the globe passes forwardly through the translucent portion 34 of the glass in the form of a softened and subdued ray of light which illuminates the face of the user without any glare effect.

Above the mirror portion 32 of the front panel 16, I have mounted a magnifying mirror 35 in a plane substantially parallel with the plane of the mirror 32 spaced a short distance in front of said mirror 32. In the arrangement shown, the magnifying mirror 35 is pivotally connected with an arm 36 upon an axis near one edge of the mirror, whereby the mirror can be turned on a substantially horizontal axis into raised position as shown in Fig. 3 or into lowered position as shown in Figs. 1 and 2, the pivotal mounting being arranged so as to hold the mirror yieldingly by friction in any adjusted position. As is best shown in Fig. 2, the arm 36 is mounted upon the forward end of a bracket 37 extending forwardly and upwardly from the top wall 20.

By my improved construction, I have provided a device which can be used to very great advantage. The magnifying mirror can be adjusted in height with respect to the base without changing its angularity with respect to the mirror portion 32, the arrangement being such that the plain mirror and the magnifying mirror can be used to advantage from the same inspection point. The provision of the frosted glass or other translucent means adjacent to the mirror 32 and also closely adjacent to the light globe insures the provision of the desired amount of light controlled and directed in such a manner as to be very effective and softened so as to be acceptable. By the provision of the ventilating openings at the top and bottom, the device is kept from becoming unduly heated; the device itself is thus protected against damage by the heat, and the comfort of the user is assured.

I claim:—

1. In a make-up mirror, the combination of a housing comprising a housing member formed of sheet metal bent into the form of a forwardly open channel with its side walls diverging forwardly from the back wall and having the metal bent in reversed directions at each side for providing inwardly open grooves along the front edges of the side walls, and a sheet of glass mounted in said grooves; a transversely adjustable tie member connecting the forward edge portions of said side walls for forcing them against the resiliency of the sheet metal into tight gripping engagement with the side edges of the glass; means for supporting an electric light globe in said housing in rear of said sheet of glass; and reflector means at a portion of the rear face of the glass for providing a mirror effect, the remaining portions of the glass alongside of the mirror portion being such as to give a frosted glass effect for softening the light diffused therethrough.

2. In a make-up mirror, the combination of a housing comprising a housing member formed of sheet metal bent into the form of a forwardly open channel with its side walls diverging forwardly from the back wall and converging downwardly and having the metal bent in reversed directions at each side for providing inwardly open grooves along the front edges of the side walls, and a sheet of glass mounted in said grooves; a transversely adjustable tie member connecting the forward edge portions of said side walls for forcing them against the resiliency of the sheet metal into tight gripping engagement with the side edges of the glass; means for supporting an electric light globe in said housing in rear of said sheet of glass; and reflector means at the middle portion of the rear face of the glass for providing a mirror effect, the upper and lower edge portions of the glass being frosted for softening the light diffused therethrough.

3. In a device of the type described, the combination of means for supporting an electric light globe, a sheet of translucent material in front of said globe adapted to permit a softened and subdued light to pass therethrough from the globe, and an outwardly facing mirror pivotally mounted in front of said translucent sheet on an axis in substantially right angular position with respect thereto so as to be adjustable edgewise.

OLIVER C. RITZ-WOLLER.